United States Patent [19]

Asakura et al.

[11] Patent Number: 4,704,245
[45] Date of Patent: Nov. 3, 1987

[54] METHOD AND APPARATUS FOR MONITORING BREAK OF ION ADSORPTION APPARATUS

[75] Inventors: Yamato Asakura, Katsuta; Shunsuke Uchida, Hitachi, both of Japan

[73] Assignee: Hitachi, Ltd., Tokyo, Japan

[21] Appl. No.: 748,332

[22] Filed: Jun. 24, 1985

[30] Foreign Application Priority Data

Jun. 25, 1984 [JP] Japan ................... 59-129357

[51] Int. Cl.[4] ............................................. G21C 17/00
[52] U.S. Cl. .................................. 376/245; 376/153; 376/313; 210/96.1; 210/662
[58] Field of Search ............... 376/153, 310, 313, 245; 210/96.1, 662; 250/458.1; 252/631, 632

[56] References Cited

U.S. PATENT DOCUMENTS

| | | | |
|---|---|---|---|
| 2,628,194 | 2/1953 | Gilwood | 210/96.1 |
| 2,954,338 | 9/1960 | Carmody | 210/662 |
| 3,172,037 | 3/1965 | Pfeiffer | 210/96.1 |
| 3,246,759 | 4/1966 | Matalon | 210/96.1 |
| 3,578,164 | 5/1971 | Weiss et al. | 210/96.1 |
| 3,964,999 | 6/1976 | Chisdes | 210/662 |
| 4,147,587 | 4/1979 | Utamura et al. | 376/31 |
| 4,303,512 | 12/1981 | Inacker et al. | 210/96.1 |
| 4,320,010 | 3/1982 | Tucci et al. | 210/96.1 |
| 4,383,046 | 5/1983 | Emmett | 210/96.1 |
| 4,401,591 | 8/1983 | Korostenski | 252/631 |
| 4,442,229 | 4/1984 | Emmett | 210/662 |
| 4,472,354 | 9/1984 | Passell et al. | 210/662 |
| 4,512,921 | 4/1985 | Anstine et al. | 252/631 |
| 4,553,034 | 11/1985 | Byers et al. | 250/458.1 |

Primary Examiner—Salvatore Cangialosi
Attorney, Agent, or Firm—Antonelli, Terry & Wands

[57] ABSTRACT

Ability of ion adsorption apparatus such as a desalting unit, etc. as used in an atomic power plant is continuously monitored, and any deterioration in the ability is detected in advance by a method and an apparatus for monitoring a break in an ion adsorption apparatus by detecting a break point of the ion adsorption apparatus using ion exchange resin, thereby determining a timing for regenerating or exchanging the resin, which comprises making an ion species having a weaker selective adsortability to the ion exchange resin as a sampling ion species than that of a target ion species to be adsorbed and present in water to be treated, and detecting leakage of the sampling ion species at the downstream side of the adsorption apparatus, thereby determining the break point of the ion exchange resin.

5 Claims, 16 Drawing Figures

METHOD AND APPARATUS FOR MONITORING BREAK OF ION ADSORPTION APPARATUS

BACKGROUND OF THE INVENTION

This invention relates to a method and an apparatus for monitoring an ability to remove impurities of an ion adsorption apparatus using ion exchange substances, etc., and particularly to a method and an apparatus for monitoring a desalting unit suitable for continuous monitoring of an ability to remove radioactive ion species of a desalting unit in a reactor cleaning system of an atomic power plant.

It has been mentioned as a cause for increasing the dose rate of radiation in commercial atomic power plants that a very small amount of various ion species such as Co ions, Ni ions, Fe ions, etc. discharged from the materials of construction in the primary cooling system are deposited on the surfaces of fuel rods, and are made racioactive through exposure to neutron irradiation, and the radioactive ion species such as $^{60}Co$ ions, $^{□}Co$ ions, $^{54}Mn$ ions, etc. are released from the fuel rods and deposited on the surfaces of pipings outside the reactor core, as disclosed, for example, in "Boshoku Gizitsu (Anticorrosion Technology)" Vol. 32, pages 276–285 (1983). Thus, it has been proposed to provide a desalting unit with ion exchange resin to remove such radioactive ion species from the core water (the desalting unit may be hereinafter referred to as "desalting unit in a reactor cleaning system"). The desalting unit in a reactor cleaning system has played an important role in prevention of an increase in the radiation dose rate in the atomic power plant.

Heretofore, monitoring of an ability to remove the radioactive ion species of a desalting unit in a reactor cleaning system has been carried out by sampling core water at the inlet and the outlet of the desalting unit and measuring concentrations (on ppm level) of ion species playing an important role in the radiation dosage rate in the plant, for example, concentrations of $^{60}Co$ ions, etc., thereby detecting deterioration of the removal ability, for example, the ability of the desalting unit through a decrease in the ratio of $^{60}Co$ ion concentration between the inlet and the outlet of the desalting unit. However, the conventional method requires 40 to 80 l of sampling water for measuring concentrations of impurity ion species on a ppm level, but the actual sampling rate is about 0.1 l/minute, and thus the required sampling time is inevitably prolonged to, for example, about 10 hours and rapid measurement is hard to conduct. Furthermore, sampling of core water is usually carried out once in a week, but the actual analysis of the sampled core water is carried out about one week after the sampling, because it is necessary to decay the radioactivity of radioactive nuclear species having a shorter half life in the sampled core water thoroughly to lower the background level. That is, it takes maximum two weeks from the start of $^{60}Co$ ion leakage from the desalting unit to the actual detection. Thus, the radioactive ion species playing an important role in the radiation dosage rate in an atomic power plant, such as $^{60}Co$ ions, etc. are concentrated and accumulated in the core water, resulting in an increase in the radiation dosage rate.

SUMMARY OF THE INVENTION

An object of the present invention is to provide a method and an apparatus for monitoring a removal ability of an ion adsorption apparatus by continuously monitoring the removal ability and detecting deterioration of the removal ability in advance.

The present invention is based on such findings that a break timing of target impurity ion species from the adsorption apparatus can be detected in advance by using an ion species having a weaker selective adsorbability (affinity) to the ion exchange resin as an indicator than that of a target impurity ion species to be removed in the adsorption apparatus and analysing break behaviors of the indicator ion species. The break of target impurity ion species to be removed, such as Co ions, Ni ions, etc., can be detected in advance by using a very small amount of Na ion species contained in the core water as an indicator when the present invention is used as a desalting unit in a reactor cleaning system in an atomic power plant, where the Na ion species is made radioactive in the reactor and is converted to $^{24}Na$, $\gamma$ ray-emitting nuclear species of relatively long half period (15 hours), and its energy is on a higher level than those of radioactive ion species of Co, Ni, etc. (for example, $^{60}Co^{2+}$ and $^{55}Co^{2+}$), so that a concentration of $^{24}Na^{+}$ at the inlet and the outlet of the desalting unit can be continuously measured with a good resolving power by $\gamma$-ray scanning at the outside of the piping.

The present invention provides a method for monitoring a break of an ion adsorption apparatus by detecting a break timing of an ion adsorption apparatus using ion exchange resin, thereby determining a regeneration or exchanging timing for the resin, wherein an ion species having a weaker selective adsorbability to the ion exchange resin than that of a target ion species to be adsorbed is added, as a sampling ion species, to water to be treated, and a leakage of the sampling ion species is detected at the downstream side of the adsorption apparatus, thereby determining a break timing of the ion exchange resin.

PREFERED EMBODIMENTS OF THE INVENTION

Embodiments of the present invention as applied to a desalting unit in an atomic power plant will be described in detail below, referring to the accompanying drawings.

Figure 1:
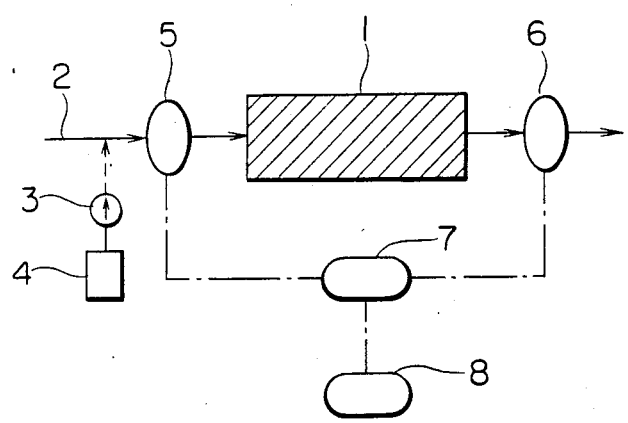
FIG. 1 is a schematic view showing the basic structure of an apparatus according to one embodiment of the present invention.

FIG. 1 is a schematic diagram showing the basic structure of an apparatus according to one embodiment of the present invention, where 1 is a desalting unit, 2 water to be treated, 3 a feed pump, 4 a tank for water containing a sampling ion species, 5 and 6 devices for measuring concentrations of sampling ion species, 7 a circuit for comparing measurements from the devices 5 and 6, and 8 a recorder. In the desalting unit 1, ion species A (target ion species to be adsorbed) contained in the water 2 to be treated is removed by adsorption. To detect a break of ion species A in advance, an ion species B (sampling ion species) having a weaker affinity to the ion exchanging substance filled in the desalting unit than that of the ion species A is added to the water 2 to be treated from the tank 4 for water containing the sampling ion species through the feed pump 3, and a concentration of ion species B is measured at the inlet and the outlet of the desalting unit 1 by the devices 5 and 6 for measuring the concentration of sampling ion species. The measurements are converted to a concentration ratio (outlet concentration/inlet concentration) by the circuit 7 for comparison, and recorded in the recorder 8 as a time function.

EXAMPLE 1

Figure 2:
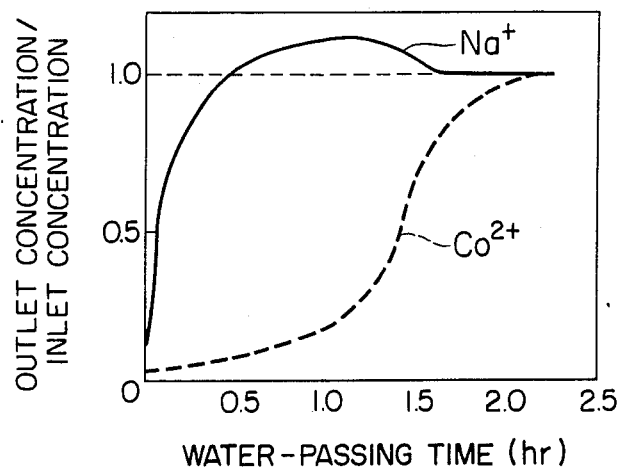
FIG. 2 is a diagram showing a relationship between the ratio of outlet concentration to inlet concentration of metal ions of a desalting unit and the water-passing time.

FIG. 2 is a diagram showing a relationship between the ratio of outlet concentration to inlet concentration of $Na^+$ and $Co^{2+}$ at a desalting unit and the water-passing time according to one embodiment of the present invention.

Generally, divalent ion species has a higher selective adsorbability to an ion exchange resin (which will be hereinafter referred to as "affinity") than monovalent ion species, and trivalent ion species has a higher affinity than the divalent ion species.

In this Example, $Co^{2+}$ was used as a target ion species to be adsorbed, and $Na^+$ was used as a sampling ion species. The concentration of $Co^{2+}$ in water to be treated was 1 ppm ($1.7 \times 10^{-5}$ moles/l), and a very small amount of an aqueous NaCl solution was added to the water to be treated to make the concentration of $Na^+$ 10 ppm ($4.3 \times 10^{-4}$ moles/l).

In FIG. 2, concentrations of $Co^{2+}$ and $Na^+$ in the effluent water from a cation exchange paper (relative to the inlet concentrations) are shown as a time function, when the aqueous solution of these two ion species in mixture was passed through the cation exchange paper (exchanging capacity: about 20 μeq) at a flow rate of 8 ml/min.

It is seen from FIG. 2 that, after complete break of $Na^+$, $Na^+$ in the Na-adsorbed layer starts to leak through replacement with $Co^{2+}$, and thus the outlet concentration of $Na^{30}$ becomes higher than the inlet concentration of $Na^+$. Until the outlet concentration of $Na^+$ reaches the maximum, leakage of $Co^{2+}$ increases relatively slowly, but after having reached the maximum outlet concentration of $Na^+$, the leakage of $Co^{2+}$ becomes considerable. When the outlet concentration of $Na^+$ becomes equal to the inlet concentration of $Na^+$, $Co^{2+}$ undergoes complete break.

The present invention is based on finding of these phenomena. That is, the period from the time when the ratio of outlet concentration to inlet concentration of $Na^+$ starts to become larger than 1 to the time when it returns to 1, preferably, the period until the ratio reaches the maximum, can be used as a timing for exchanging the ion exchange resin with respect to the target ion species to be adsorbed, i.e. $Co^{2+}$.

This will be described in detail below. The results of measurement shown in FIG. 2 can be explained from the behaviors shown in FIGS. 3 and 4.

Figure 3:
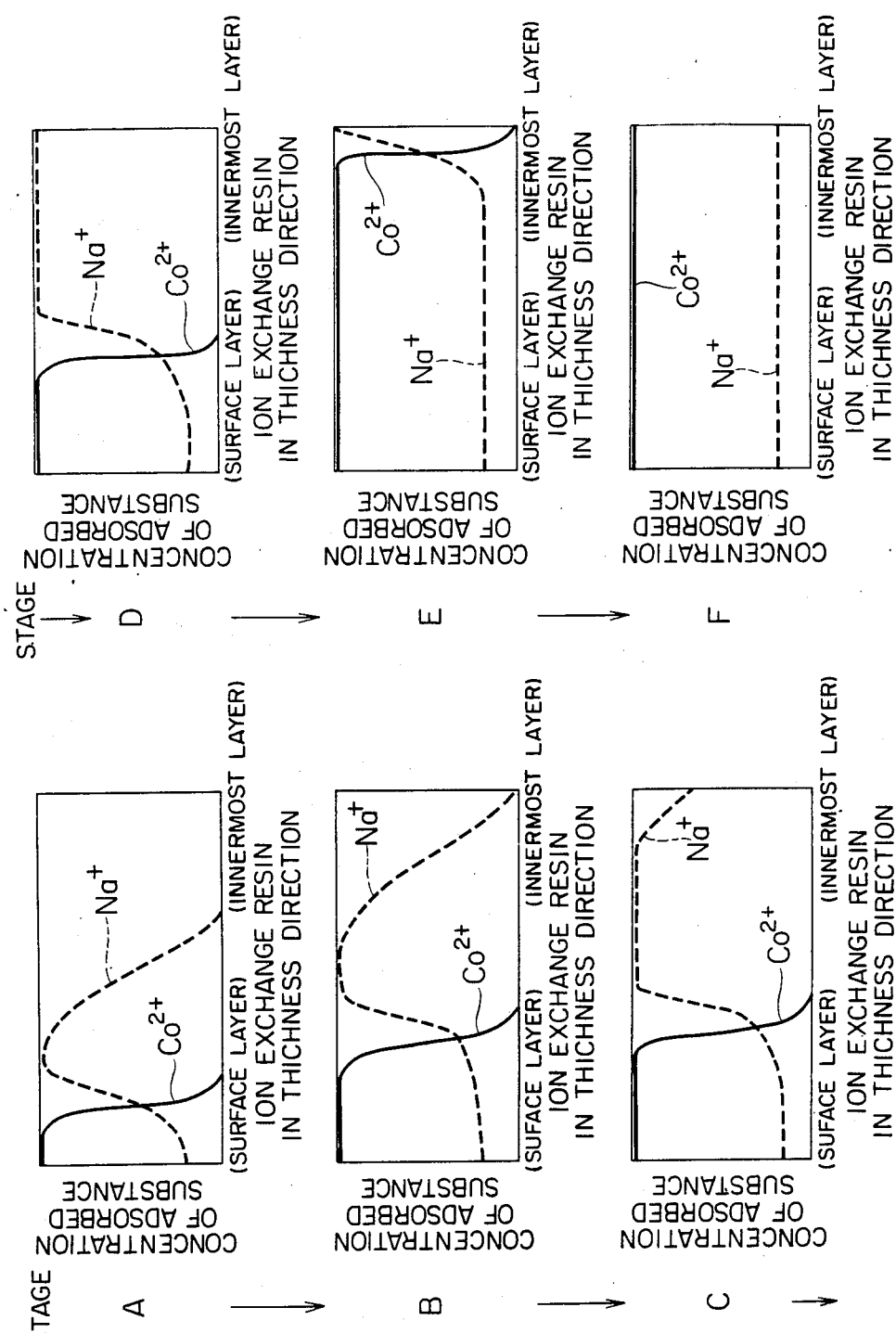
FIG. 3 is diagrams showing concentrations of adsorbed metal ion species in the thickness direction of ion exchange resin layer.

In FIG. 3, distribution of concentrations of adsorbed substances in an ion exchange resin layer is schematically shown with respect to adsorption time as a parameter, where the axis of abscissa shows the thickness direction of ion exchange resin, and the axis of ordinate shows concentrations of adsorbed substances. At stage A, there remains an unadsorbed layer for both $Co^{2+}$ and $Na^+$; at stage B, $Na^+$ having a weaker selective adsorbability to the ion exchange resin than $Co^{2+}$ starts to break; at stage C $Na^+$ break has proceeded; at stage D the entire ion exchange resin layer is in an adsorption equilibrium state with $Na^+$; at stage E $Co^{2+}$ starts to break; at stage F the entire ion exchange resin layer is also in an adsorption equilibrium state with $Co^{2+}$.

Figure 4:
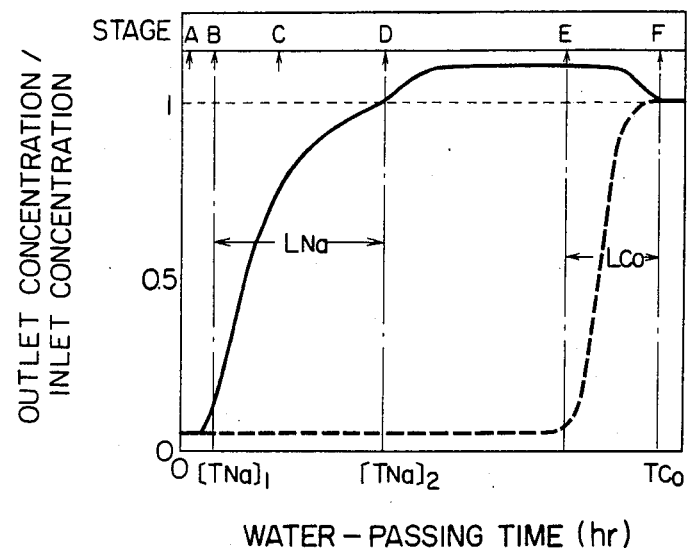
FIG. 4 is a diagram showing a relationship between the ratio of outlet concentration to inlet concentration of metal ions of a desalting unit and the water-passing time.

FIG. 4 shows the states of each stage in FIG. 3 in contrast with break curves of FIG. 2. Suppose that the time until $Na^+$ starts to break is $[T_{Na}]_1$, the time till the stage D at which $Na^+$ undergoes complete break is $[T_{Na}]_2$, the time till the stage F at which $Co^{2+}$ undergoes complete break is $T_{Co}$, the distribution coefficient of $Na^+$ to H-form ion exchange resin (which is defined by a ratio of [amount of adsorbed ions per unit weight of ion exchange resin] to [amount of ions per unit volume of liquid phase] to serve as an index for the selective adsorbability of ions) is $K_{Na}$, and the distribution coefficient of $Co^{2+}$ is $K_{Co}$, the following relations is established under constant conditions for adsorption operations.

$$[T_{Na}]_2/[T_{Co}] \simeq K_{Na}/K_{Co} \tag{1}$$

Suppose that the extension or width of the adsorption zone for Na is $L_{Na}$ (which corresponds to $[T_{Na}]_2 - [T_{Na}]_1$), and the extension or width of the adsorption zone for Co is $L_{Co}$, the following relationship is established.

$$L_{Na}/L_{Co} \simeq K_{Co}/K_{Na} \tag{2}$$

Thus, it is possible to estimate the time $T_{Co}$ till the stage F at which $Co^{2+}$ starts to undergo complete break by measuring the time $[T_{Na}]_2$ till the stage D at which the outlet concentration of Na becomes larger than 1 and by making calculation according to said equation (1). On the other hand, it is possible to estimate the extension or width $L_{Co}$ of the adsorption zone for $Co^{2+}$ by measuring the extension or width $L_{Na}$ of the adsorption zone for $Na^+$ and making calculation according to said equation (2). It is also possible to estimate the time $T_B$ from the state of stage D till the stage E at which $Co^{2+}$ starts to break according to the following equation by using the thus obtained values $T_{Co}$ and $L_{Co}$.

$$T_B = T_{Co} - L_{Co}$$

$$T_B = [T_{Na}]2(K_{Co}/K_{Na}) - L_{Na}(K_{Na}/K_{Co}) \qquad (3)$$

In the case of the cation exchange paper with $K_{Co} = 3.6$ and $K_{Na} = 1.2$ as used in this Example, the value $T_B$ can be estimated to be 1 hour from $[T_{Na}]$ of 0.4 hours and $L_{Na}$ of 0.4 hours according to said equation (3). The value $T_B$ is in good agreement with the test values shown in FIG. 2, and the foregoing estimating procedure is found to be quite appropriate.

EXAMPLE 2

Figure 5:
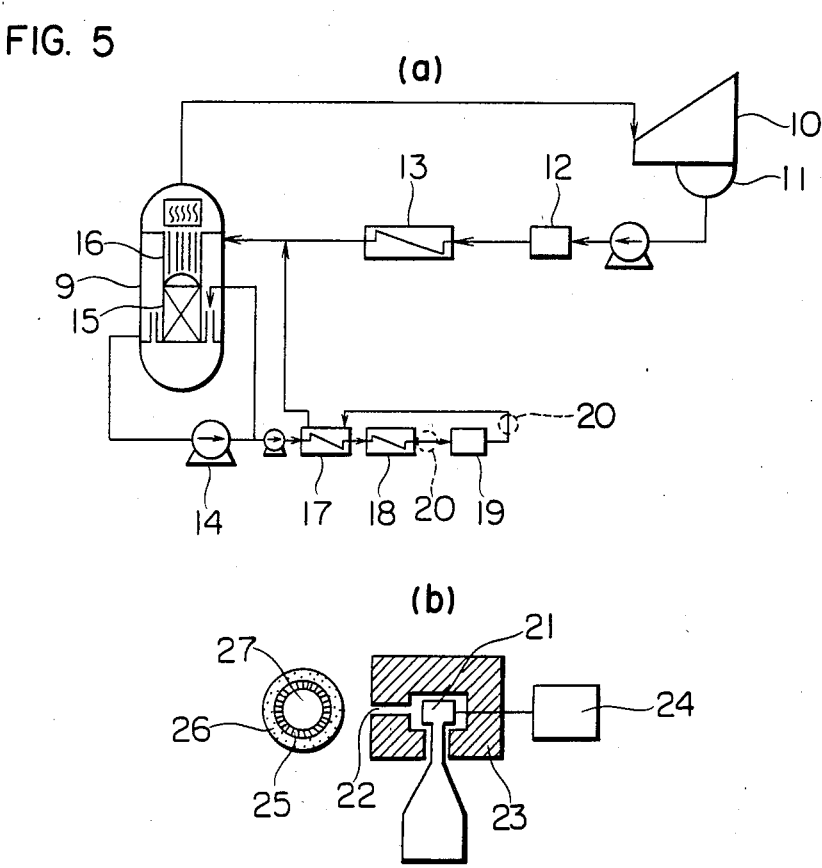
FIG. 5(a) is a plant flow sheet showing an application of the present invention to a desalting unit in a reactor cleaning system of an atomic power plant.
FIG. 5(b) is a cross-sectional view of the structure of an apparatus for monitoring a break in the application of FIG. 5(a).

FIG. 5 shows an application of the present invention to monitoring of a break in the desalting unit in a reactor cleaning system. Main steam generated in a nuclear reactor 9 and fed to a turbine 10 therefrom is condensed into water in a condenser 11. The condensate is removed from impurities in a condensate desalting unit 12, then heated in a feedwater heater 13 and returned to the nuclear reactor 9. On the other hand, cooling water is passed through a core 15 at such a high speed as up to 2 m/sec by a recycle pump 14 to remove the heat from the core 15.

The steam generated by the heating is separated from the water by a separator 16 at the overhead of the core and is led to the turbine as the main steam, as mentioned above.

Generally, the steam quality in the core zone is about 10%, and consequently the cooling water is forcedly circulated at a flow rate about ten times those of the main steam and the feedwater. The feedwater to the nuclear reactor is removed from the impurities in the condensate desalting unit, as mentioned above, but the percent impurity carryover to the main steam is so small that the impurities brought into the nuclear reactor from the feed water, though even in a very small amount, will be concentrated in the nuclear reactor, when the water-passing time is prolonged. Particularly the corrosion products from the materials of construction are made radioactive in the core and converted to radioactive corrosion products. Thus, it is important to suppress their concentration. To this end, a portion of the recycle water is led to the reactor cleaning system, where the impurities are removed to suppress the concentration of radioactive corrosion products. The reactor cleaning system comprises a regenerating heat exchanger 17, a non-regenerating heat exchanger 18 and a desalting unit 19. Through said two heat exchanger 17 and 18, the core water at 285° C. is cooled almost to the ordinary temperature, and then the cooled core water is passed through the desalting unit to remove impurities consisting mainly of ions, and then heated to about 200° C. through the shell side of the regenerating heat exchanger 17. The desalted core water has a temperature approximating to that of the feedwater, and thus is not directly returned to the nuclear reactor, but added to the feedwater, and then fed to the nuclear reactor.

The desalting unit in the reactor cleaning system comprises cation exchange resin for trapping cations such as $Co^{2+}$, $Fe^{2+}$, $Ni^{2+}$, etc., and anion exchange resin for trapping anions such as $Cl^-$, etc. That is, both cation and anion exchange resins are used in a mixture. As the ion exchange resins for the desalting unit in the reactor cleaning system bead-shaped ion exchange resin and powdery ion exchange resin can be used, but this example is directed to the case of filling the latter ion exchange resin, that is, powdery ion exchange resin.

Powdery ion exchange resin is usually used in the purification of core water by mixing anion exchange resin and cation exchange resin together, coaqulating the mixture into a floc form, and precoating a nylon or stainless steel element with the ion exchange resin coaqulate flocs. Removal is made mainly of $^{60}Co$ with a long half-life and a high energy emission level of $\gamma$-rays, which is produced in a larger amount among the radioactive corrosion products.

Generally, cobalt ions exist as divalent ions. Likewise, Ni and Fe ions exist as divalent ions, and generally core water is contaminated with Na ions that come in during the regeneration of the condensate desalting unit in the condensate purification system. The Na ions exist as positive monovalent ions.

Figure 6:
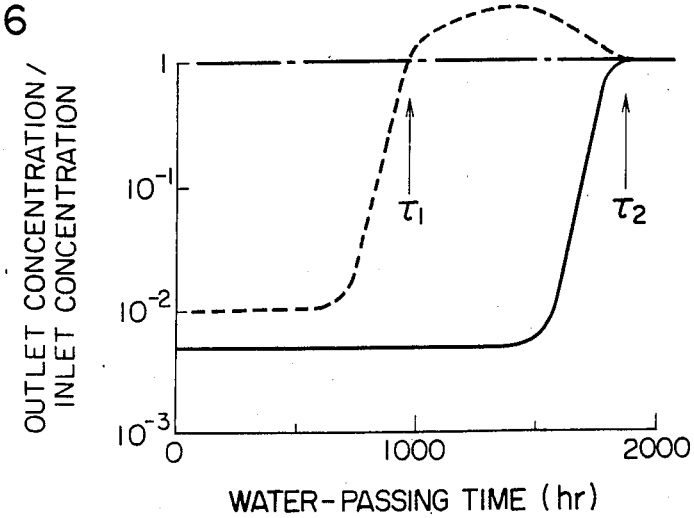
FIG. 6 is a diagram showing break characteristics in the desalting unit.

Suppose that 10 kg of cation exchange resin is filled in the desalting unit in the reactor cleaning system, 60 tons of core water to be treated is passed through the desalting unit, and the core water contains $10^{-7}$ mol/l of monovalent ions such as $Na^+$, etc. and $0.5 \times 10^{-7}$ mol/l of divalent ions such as $Co^{2+}$, $Ni^{2+}$, etc., where the exchanging capacity of cation exchange resin is up to 1 meq/g. In that case, a ratio of inlet concentration to outlet concentration of the desalting unit is 10 to 100. Changes with time in the ion concentration at the outlet of the desalting unit are shown in FIG. 6 as relative values to the inlet concentration. About 800 hours after the start to pass the water through fresh cation exchange resin, monovalent ions start to break, and their concentration at the outlet of the desalting unit increases, whereas the divalent ions have a higher affinity than the monovalent ions, and thus are trapped in exchange with the monovalent ions already trapped on the exchange groups. That is, the concentration of divalent ions is kept low at the outlet of the desalting unit, even after the monovalent ions have started to break. About 1,600 hours after the start to pass the water, the cation exchange resin is saturated with the divalent ions, and the divalent ions start to break. That is, the break of monovalent ions always appears before the break of divalent ions, and thus the life of the resin in the desalting unit can be determined by detecting the break behavior of monovalent ions, and it is possible to schedule a timing for exchange or regeneration of the resin.

As shown in FIG. 5, a semi-conductor detector units 20 are provided at the inlet and the outlet of the desalting unit 19 in this example to directly measure concentration of radioactive $^{24}Na^+$ of $Na^+$ isotopes which are typical of monovalent ion species, and continuously monitor the break behavior of the monovalent ions. That is, the semi-conductor detector unit 20 comprises a semiconductor detector 21, a collimeter 22, a shield surrounding the detector 21 to prevent $\gamma$-rays from entering from other parts than the collimeter into the detector, and a pulse height avalyzer 24 that treats signal from the detector to identify the nuclear species from the pulse height distribution.

The semi-conductor detector unit is provided by aligning the axis of collimeter 22 with the center line of the piping, and selectively measure the $\gamma$-ray from the radioactive isotope in cooling water through the pipe wall 25 and the heat-insulating material 26.

Figure 7:
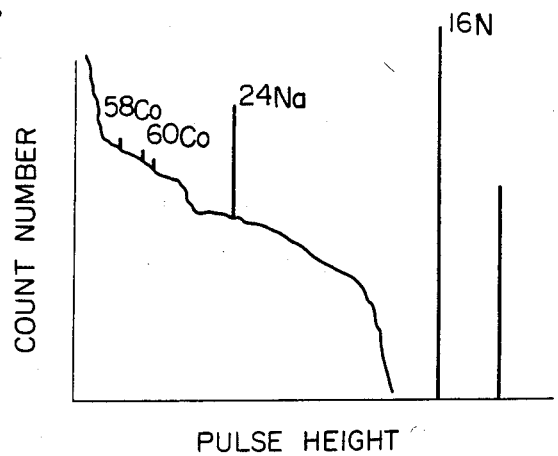
FIG. 7 is a diagram showing results of measuring a $\gamma$-ray pulse height distribution in the inlet piping to a desalting unit.
Figure 8:
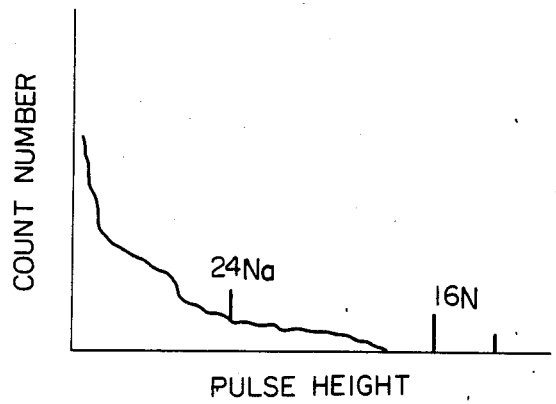
FIG. 8 is a diagram showing results of measuring a $\gamma$-ray pulse height distribution in the outlet piping from a desalting unit.
Figure 9:
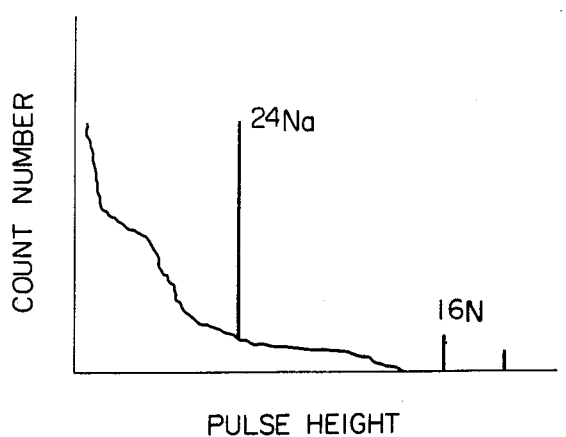
FIG. 9 is a diagram showing results of measuring a γ-ray pulse height distribution in the outlet piping from a desalting unit after break of monovalent ion species.

Results of the measurement at the inlet of the desalting unit are shown in FIG. 7, and results of measurement in FIGS. 8 and 9. Particularly FIG. 8 shows the results of measurement where the water-passing time shown in FIG. 6 is shorter than the break time $\tau_1$ of monovalent ions, and FIG. 9 shows the results of measurement where the water-passing time is shorter than the break time $\tau_2$ of divalent ions. The peak of $^{24}$Na can be identified, though influenced by $^{16}$N of high energy level. Particularly after the break of monovalent ions shown in FIG. 7, the presence of $^{24}$Na becomes remarkable, and a timing for exchanging the resin in the desalting unit can be selected. That is, it is seen from FIG. 6 that the timing should be set between the water-passing time when the ratio of outlet concentration to inlet concentration of $^{24}$Na$^+$ through the desalting unit starts to exceed 1 Dand the water-passing time when it returns to 1. In this case, no substantial leakage of divalent ions such as Co$^{2+}$ (radioactive $^{60}$Co$^{2+}$, radioactive $^{58}$Co$^{2+}$), Ni$^{2+}$, etc. takes place in the period from the water-passing time when the ratio exceeds 1 to the water-passing time when the ratio reaches the maximum, and the leakage of divalent ions is rapidly increased from the water-passing time when the ratio exceeds the maximum, as in the case of Example 1. Thus, it is desirable to set the actual timing for exchanging the resin at a time in the period from the time when the ratio exceeds 1 to the time when the ratio reaches the maximum.

In this example, the case that the break of divalent ions is detected in advance in view of the break time difference between the monovalent cations and the divalent cations is shown, but this is also valid for the case that trivalent ions are contained. Furthermore, it is possible to detect the break of target ion species by monitoring a break of ion species having a weaker ion selectivity than that of the target ion species by virtue of a difference in the affinity between the respective ion species.

The present invention is applicable not only to cation exchange resin, but also to anion exchange resin, and it is possible to detect the break of the target anion species in advance from the break of anion species having a weaker affinity by virtue of a difference in the affinity between the monovalent anion species and the multivalent anion species.

Figure 10:
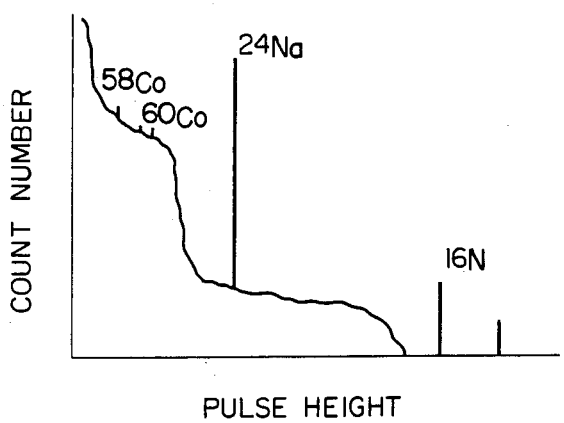
FIG. 10 is a diagram showing results of measuring a γ-ray pulse height distribution after decaying of $^{16}N$ in FIG. 6.

According to another embodiment of the present invention, a branched piping is provided at the inlet to the desalting unit, and a portion of water is passed through the branched tube to analyze nuclear species by use of a semi-conductor detector unit in the same manner as in FIG. 5. This case is characterized by setting a time lag between the point of branching and the point of measurement, as desired, by selecting the distance between the point of branching and the point of measurement and the flow rate of the branched stream. This leads to an improvement in exactness of measurement of $^{24}$Na by utilizing a difference in the half life between $^{16}$N having a shorter half life of up to 6 seconds and $^{24}$Na having a longer half life of 15 hours, and selectively decaying only $^{16}$N. An example of the measurement for this case is shown in FIG. 10.

According to the present invention, it is possible to detect the break of target ion species due to reduction in the ion exchange resin ability to remove the target ion species in advance by monitoring the life of the ion exchange resin in a nuclear reactor cleaning system, and also to greatly increase the reliability of the reactor cleaning system. Furthermore, ion analysis so far conducted at the outlet of a desalting unit by operating personal can be made automatically on line, and the necessary man-hour labor can be considerably reduced together with the reduction in possible radiation hazard on the operating personel engaging in the relevant work.

Furthermore, measurement of $^{24}$Na makes it possible to conduct on-line monitoring of Na concentration in the core water pH control by NaOH injection, etc., resulting in improvement in the exactness of core water pH measurement.

What is claimed is:

1. A method for monitoring a break in an ion adsorption apparatus in a core water purification system of a nuclear reactor with a primary water coolant containing sodium ions by detecting a break point of the ion adsorption apparatus using ion exchange resin, thereby determining a time for regenerating or exchanging the resin, which comprises making a sampling ion species having a weaker selective adsorbability to the ion exchange resin than that of a target ion species to be adsorbed also present in water to be treated, and detecting leakage of the sampling ion species at the downstream side of the adsorption apparatus, thereby determining the break point of the ion exchange resin; said sampling ion species being radioactive sodium ions and said target ions species being radioactive cobalt ions.

2. A method according to claim 3, wherein a change in concentration of the sampling ion species between the upstream side and the downstream side of the adsorption apparatus, thereby determining a time $(Ts)_1$ at which the outlet concentration of the sampling ion species starts to increase from an initial constant value and a time $(Ts)_2$ at which a ratio of outlet concentration to inlet concentration of the sampling ion species starts to exceed 1, and determining a break time $T_B$ of the target ion species to be adsorbed according to the following formula:

$$T_B = (Ts)_2(Ko/Ks) - \{(Ts)_2 - (Ts)_1\}(Ks/Ko)$$

wherein Ko is a distribution coefficient of the target ion species to be adsorped to the ion exchange resin and Ks is a distribution coefficient of the sampling ion species thereto.

3. A method according to claim 1, wherein concentrations of the sampling ion species are detected at the upstream side and the downstream side of the adsorption apparatus, and the break time is a period from a time at which the ratio of outlet concentration to inlet concentration starts to exceed 1 to a time at which the ratio returns to 1.

4. An apparatus for monitoring a break of ion adsorption apparatus in a core water purification system of a nuclear reactor with a primary water coolant containing sodium ions, which comprises an adsorption unit with ion exchange resin, two radioactive detectors, one at the upstream side and the other at the downstream side of the adsorption unit, and a unit for calculating a ratio of concentrations detected by the two detectors; means for making a sampling ion species having a weaker selective adsorbability to the ion exchange resin than that of a target ion species to be adsorbed also present in water to be treated, said sampling ion species being radioactive sodium ions and said target ion species being radioactive cobalt ions; and means for detecting leakage of he sampling ion species at the downstream side of the adsorption apparatus including said two radioactive detectors and the unit for calculating a ratio of concentrations, the concentrations of the sampling ion species being detected at the upstream side and the downstream side of the adsorption apparatus by said detectors and the break time being a period from a time at which the ratio of outlet concentration to inlet concentration of the sampling ion species starts to exceed 1 to a time at which the ratio returns to 1.

5. A method according to claim 3, wherein the concentrations of the radioactive sodium ions are determined by γ-ray scanning of piping containing the water to be treated upstream and the water treated downstream of the adsorption apparatus.

* * * * *